Patented July 29, 1952

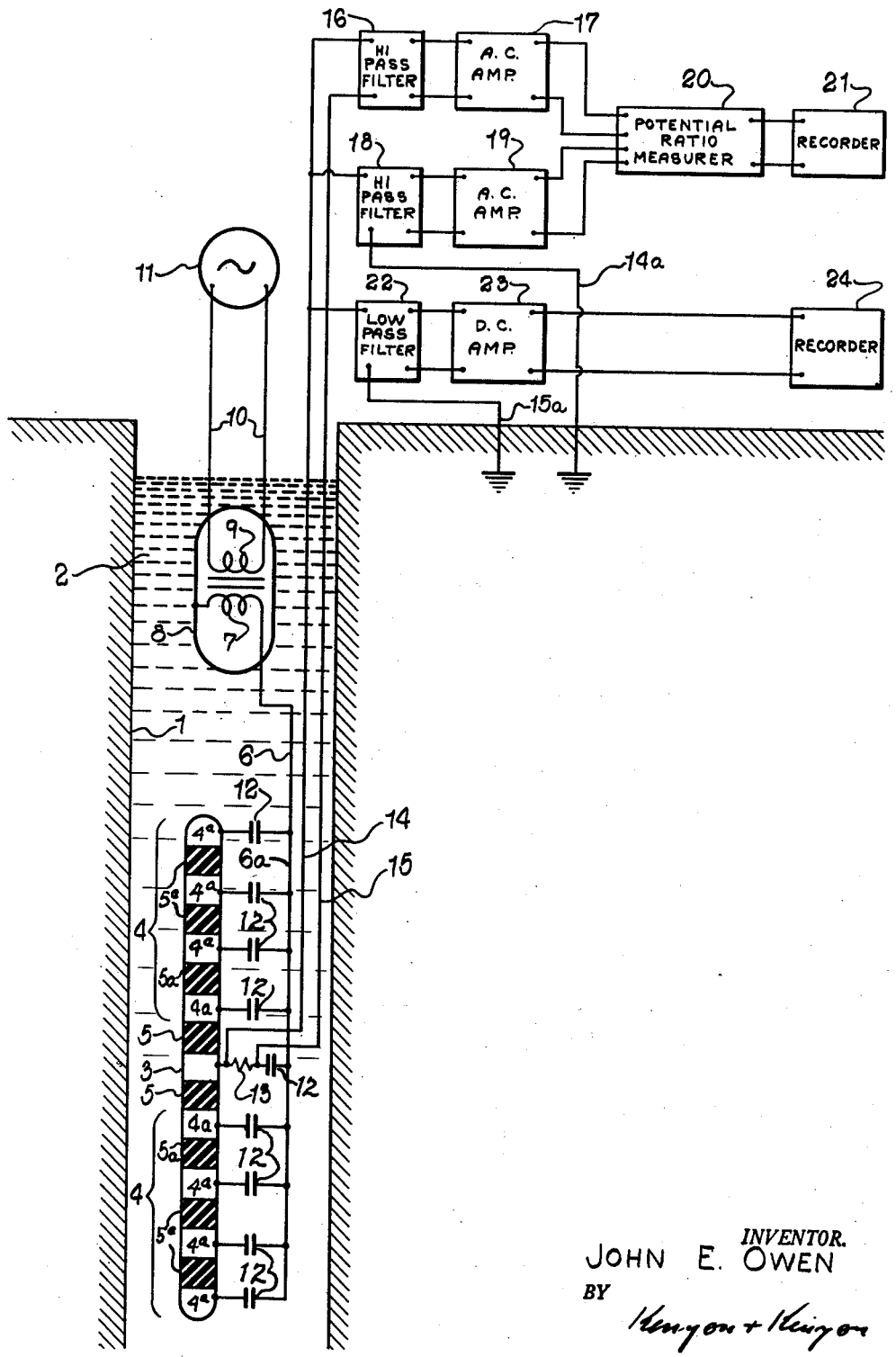

2,605,321

UNITED STATES PATENT OFFICE 2,605,321

ELECTRICAL WELL LOGGING APPARATUS

John E. Owen, Tulsa, Okla., assignor to Geophysical Research Corporation, New York, N. Y., a corporation of New Jersey Application June 21, 1951, Serial No. 232,832

6 Claims. (Cl. 175—182)

This invention relates to electrical well logging apparatus of the type using an electrode assembly comprising a short exploring electrode and elongated guard electrodes positioned both above and below this exploring electrode. By setting up substantially equal potential drops between these electrodes and an electrode spaced above or below them, the current flowing through the exploring electrode is dependent mainly on the resistivity or conductivity of a narrow horizontal section of the strata surrounding the bore hole at the level of the exploring electrode. Thus a more sharply defined and accurate resistivity or conductivity curve may be logged.

Apparatus of the above type is disclosed and claimed by the John E. Owen Patent No. 2,446,303, issued August 3, 1948.

The use of this type of apparatus involves a problem when it is desired to log a spontaneous potential curve simultaneously with the logging of the resistivity or conductivity curves. This problem is due to the long guard electrodes positioned above and below the exploring electrode and which seriously alter the natural values of the spontaneous potentials existing in the mud column in the vicinity of these electrodes. The long electrodes in effect short circuit the spontaneous potentials. Because of this, true readings of the spontaneous potentials can be obtained only from electrodes positioned a substantial distance above or below the guard electrodes and, therefore, necessarily a substantial distance above or below the exploring electrode located between the guard electrodes. Consequently, when a spontaneous potential curve is recorded simultaneously with the recording of a resistivity or conductivity curve, by the use of the guard electrode assembly, the respective curves on the log, for any given depth of measurement actually represent measurements obtained at substantially different depths. This renders the log confusing and necessitates correction for the displaced position of the spontaneous potential electrode relative to the exploring electrode from which the resistivity or conductivity curves are obtained. Incidentally, although it is common to log a resistivity curve, it is desirable in some instances to log a conductivity curve, and in such instances this is done simultaneously with the recording of the resistivity and spontaneous potential curves.

One of the objects of the present invention is to provide a practical means for overcoming the problem described above. Another object is to provide an electrical well logging apparatus using a guard electrode assembly with all of its attendant advantages but providing for recording a curve of the spontaneous potentials existing in the immediate vicinity of the exploring electrode from which the resistivity or conductivity curves are obtained. Other objects may be inferred from the following.

A specific example of the invention is illustrated in a schematic manner by the single figure of the accompanying drawing.

This drawing shows an uncased well or bore hole 1 formed in the earth and passing through different formations having different specific electrical resistivities. The well contains a column 2 of electrically conductive liquid in the form of the usual drilling mud.

An exploring electrode 3 is shown down in the well with elongated guard electrodes 4, in a new form, positioned both above and below it, the electrodes 3 and 4 being formed as a structurally integrated unit with insulation 5 separating the electrodes. An electric power feeder line 6 connects the electrode sections with the secondary 7 of a transformer located inside of a hollow electrode 8 with which the other end of this secondary connects. The primary 9 of this transformer connects with power lines 10 extending up the well to a source of alternating current 11. The electrode 8 forms a grounded electrode which with the electrode sections 3 and 4 are energized by the secondary 7 to flow the current through the earth formations surrounding the well adjacent to these electrodes.

Excepting for the short exploring electrode 3 and the insulation 5 the length of the unit is equally divided between the long upper and lower guard electrodes 4. In the prior art devices of this type these long guard electrodes are formed by longitudinally continuous conductive surfaces. Thus it can be seen that the values of the spontaneous potentials are upset considerably by the long guard electrodes, thus requiring their measurement at a substantial distance above or below the unit. The grounded electrode 8 may be made relatively short in length and it functions satisfactorily when at about twenty-five feet above or below the guard electrode unit. Therefore, it is possible to include a spontaneous potential measuring electrode as a part of this grounded electrode, but then the spontaneous potentials are measured at a distance of more than twenty-five feet from the location where the resistivity or conductivity is measured.

A guard electrode unit is suspended by a cable so that it may be moved up or down through the well. The cable incorporates various electrical conductors as required to energize the electrodes and to measure the desired electrical values. The lines 6 and 10 may be provided by such conductors under actual operating conditions. The grounded electrode 8 is also supported by the cable at a suitable distance above the guard electrode unit, so all of the electrodes may be moved up and down simultaneously.

In the case of the present invention the guard electrodes 4 differ from the prior art form by being each formed by a plurality of short segments 4a spaced from each other by short lengths of electrical insulation 5a. In other words, the guard electrode units is made in the form of a series of mutually spaced short electrodes separated by insulation from each other. Thus the former long conductive paths of the guard electrodes are interrupted so as to avoid their shorting effect on the spontaneous potentials existing in the drilling mud 2. Each of the segments 4a may have about the same length as the customarily short exploring electrode 3. The insulation 5a is illustrated as having the same lengths as the electrode segments.

The guard electrode unit can be hollow and it may house the various electrical units required by this invention. In the drawing these are shown externally to clarify the details.

With the above understanding the line 6 forms or connects with a common electric power feeder bus 6a for the various electrode segments or sections. This bus connects with each segment or section through a condenser 12, there being an individual condenser for each segment or section. In the case of the central segment or section, comprising the exploring electrode 3, its condenser connects through an electrical impedance 13 of sufficiently low value to maintain the exploring electrode at a potential that is substantially the same as the potential applied to the segments 4a, in so far as practical well logging conditions are concerned. Two conductors 14 and 15 are arranged in shunt connection with the impedance 13 and extend up the well.

The alternating current source 11 energizes the grounded electrode 8 and each of the sections 3 and 4a so that alternating current flows through them and the earth around the well. The condensers 12 have a capacity which passes this current while blocking direct current. Since spontaneous potentials are in the form of direct current their natural values are not upset substantially by the elongated guard electrodes 4 since they comprise the various short segments 4a which are insulated from each other respecting direct current. The conductor 14 and the earth carry both the direct current potential of the spontaneous potentials existing adjacent to the exploring electrode 3, and the alternating current potential of this exploring electrode resulting from the source 11. Two conductors provided by the conductor 14 and another conductor 15 pick potential from the impedance 13 which is proportional to the current flowing through this resistance, to provide for measuring the current flow through the exploring electrode.

The alternating current source 11 may be located on the ground level adjacent to the mouth of the well 1, as may be the equipment described below. The conductors 14 and 15 may be incorporated by the cable supporting the electrodes.

The conductors 14 and 15 are connected through a filter 16 to the input of an alternating current amplifier 17. This filter 16 is of the type which passes alternating current having the frequency provided by the source 11, while rejecting or blocking direct current. The filter 16 may comprise any suitable high-pass filter and it feeds the amplifier 17 with the alternating current potential picked from the impedance 13. The conductor 14 and a grounded conductor 14a feed the alternating current potential, on the exploring electrode 3, through a corresponding high-pass filter 18 to the input of another alternating current amplifier 19. The two outputs from the amplifiers 17 and 19 are fed to the inputs of an alternating current potential ratio measurer 20 of the type disclosed by the Alfred Wolf Patent No. 2,400,326, issued May 14, 1946, and the output from this device is fed to a potential measurer and recorder 21. The conductor 14 and a grounded conductor 15a connect through a filter 22 to the input of a direct current amplifier 23. This filter 22 passes direct current and rejects or blocks alternating current having the frequency of the source 11. This filter 22 may be any suitable low-pass filter. The output of this amplifier 23 connects with a potential measurer and recorder 24.

The recorders 21 and 24 may comprise the mirror galvanometers of an optical oscilloscope which records simultaneously on the usual light-sensitive log strip moved synchronously with the movement of the electrodes through the well. The recorder 21 records the resistivity curve or the conductivity curve, depending upon how its input terminals are connected with the output terminals of the amplifiers 17 and 19. The recorder 24 records the spontaneous potential curve. When recorded in the usual way, these curves, in the practice of the present invention, are representative of the same positions in the well for corresponding depth readings. This follows since they are all obtained from the one exploring electrode 3.

It can be seen from the foregoing that by a suitable proportioning of the dimensions of the electrode sections and of the values of the condensers 12, the desired results can be obtained. The guard electrodes 4, formed by the segments 4a will not have any material shorting effect on the spontaneous potentials logged.

As an example of suitable values, assuming that the source 11 provides a frequency of 200 cycles per second, the condensers 12 may have a capacity of 2000 microfarads, and the electrode segments 4a may have a diameter of three inches and a one inch axial length. At the mentioned frequency the impedance of a 2000 microfarad condenser is approximately 0.4 ohm, whereas the impedance of an electrode segment of the described dimensions is about 20 ohms when in an homogeneous earth of about 1 ohm-meter resistivity. Lower values of earth resistivity are seldom encountered. Thus the 0.4 impedance of each condenser 12 is negligibly small in comparison with the minimum impedance which each electrode segment 4a feeds. The top and bottom end segments may be an exception, since their ends are exposed to the mud, and for these it may be desirable to use somewhat larger condensers to maintain the proper potentials. The impedance 13 may comprise a ¼ ohm resistor, which value is negligibly small in comparison with the minimum resistance fed by the exploring electrode 3. It follows that for practical purposes all of the electrode sections or segments are provided with equal potentials, although electrically insulated from each other, by the condensers, respecting direct current.

As previously indicated the filters 16 and 18 should pass the 200 cycle alternating current freely but should offer an adequate impedance to the direct current to effectively block the same, while the filter 22 should pass the direct current but effectively reject the alternating current by providing an adequate impedance thereto. The filter 22 should also pass fluctuating current of very low frequency as caused by the motion of the electrode assembly through the well during the running of a log. At normal logging speeds this is approximately 1 cycle per second. This very low frequency fluctuation does not reintroduce the previously mentioned problem respecting the elongated guard electrodes, because at this frequency two 2000 microfarad condensers in series, as they are between any two of the segments 4a, offer an impedance of approximately 60 ohms. This is as great as the resistance of a normal drilling mud column several feet in length and the diameter of the electrode, and since this is the section of the mud that the electrode replaces it follows that there is no shorting effect in a practical sense.

It follows from the foregoing that this invention makes it possible to use the guard electrode assembly and to measure and log the spontaneous potentials as well as the apparent resistivities or conductivities by using the single short exploring electrode positioned between the guard electrodes. The segmented guard electrodes may be made as long as is desired or required to provide their guarding effect.

I claim:

1. Electrical well logging apparatus including an elongated electrode assembly formed by a plurality of mutually spaced electrode sections substantially isolated electrically from each other respecting direct current, a grounded electrode, means for establishing substantially equal alternating current potential drops between said grounded electrode and said sections, means for measuring alternating current flowing through one of said sections, and means for measuring direct current potential between one of said sections and the earth.

2. Electrical well logging apparatus including an elongated electrode assembly formed by a plurality of mutually spaced electrode sections substantially isolated electrically from each other respecting direct current, a grounded electrode, means for establishing substantially equal alternating current potential drops between said grounded electrode and said sections, means for measuring alternating current flowing through one of said sections located substantially at the center of said elongated electrode, and means for measuring direct current potential between said section and the earth.

3. Electrical well logging apparatus including an elongated electrode assembly formed by a plurality of mutually spaced electrode sections substantially isolated electrically from each other respecting direct current, a grounded electrode, means for establishing substantially equal alternating current potential drops between said grounded electrode and said sections, means for measuring alternating current flowing through one of said sections, means for moving said elongated electrode through the well, a conductor connected with one of said sections, a grounded conductor, said conductors carrying the potentials of said alternating current and of direct current spontaneous potentials existing in the well, a potential measuring device connected with said conductors, and a filter interposed in said conductors and constructed to pass direct current and fluctuating current having frequencies caused by the movement of said elongated electrode through the well and substantially to block alternating current having the frequency of said alternating current.

4. Electric well logging apparatus including a guard electrode assembly comprising a short exploring electrode section and a plurality of short guard electrode sections positioned above and below said exploring section with all of said sections separated from each other by insulation, a grounded electrode, a conductor, means for energizing said grounded electrode and said conductor with alternating current, each of said sections having an individual condenser through which it is connected to said conductor and said condensers having a low impedance to said alternating current and a high impedance to direct current, means for measuring alternating current flowing through said exploring section, and means for measuring the direct current potential between said exploring section and the earth.

5. Electrical well logging apparatus including an electrode assembly comprising an exploring electrode and elongated guard electrodes positioned both above and below said exploring electrode, each of said guard electrodes comprising a plurality of short separate spaced from each other and from said exploring electrode by short lengths of insulation, each of said sections and said exploring electrode having an individual condenser and a common electric power feeder bus connected therewith through said condenser, said exploring electrode being connected with its condenser through an impedance.

6. Electrical well logging apparatus including an electrode assembly comprising an exploring electrode and elongated guard electrodes positioned both above and below said exploring electrode, each of said guard electrodes comprising a plurality of short segments spaced from each other and from said exploring electrode by short lengths of insulation, each of said sections and said exploring electrode having an individual condenser and a common electric power feeder bus connected therewith through said condenser, said exploring electrode being connected with its condenser through an impedance, means for moving said assembly through a well, a grounded electrode, means for energizing said grounded electrode and said bus with alternating current, a first conductor connected directly with said exploring electrode, a second conductor connected with said exploring electrode through said impedance, a direct current blocking filter connected with said conductors and passing said alternating current, a direct current blocking filter connected with said first conductor and the earth and passing said alternating current, and a filter connected with said first conductor and the earth and blocking said alternating current and passing direct current and fluctuating current having a frequency caused by the movement of said assembly through a well, said condensers having a high impedance to direct current and current having said frequency and having a low impedance to said alternating current.

JOHN E. OWEN.

REFERENCES CITED

The following references are of record in the file of this patent:

UNITED STATES PATENTS

| Number | Name | Date |
|---|---|---|
| 2,248,982 | Gillbergh | July 15, 1941 |
| 2,379,106 | Sanders | June 26, 1945 |
| 2,412,363 | Silverman | Dec. 10, 1946 |
| 2,446,303 | Owen | Aug. 3, 1948 |